June 8, 1965  H. M. GREENE, JR  3,187,813
APPARATUS FOR DEPOSITING CEMENT OR THE LIKE IN A WELL
Filed Dec. 12, 1961
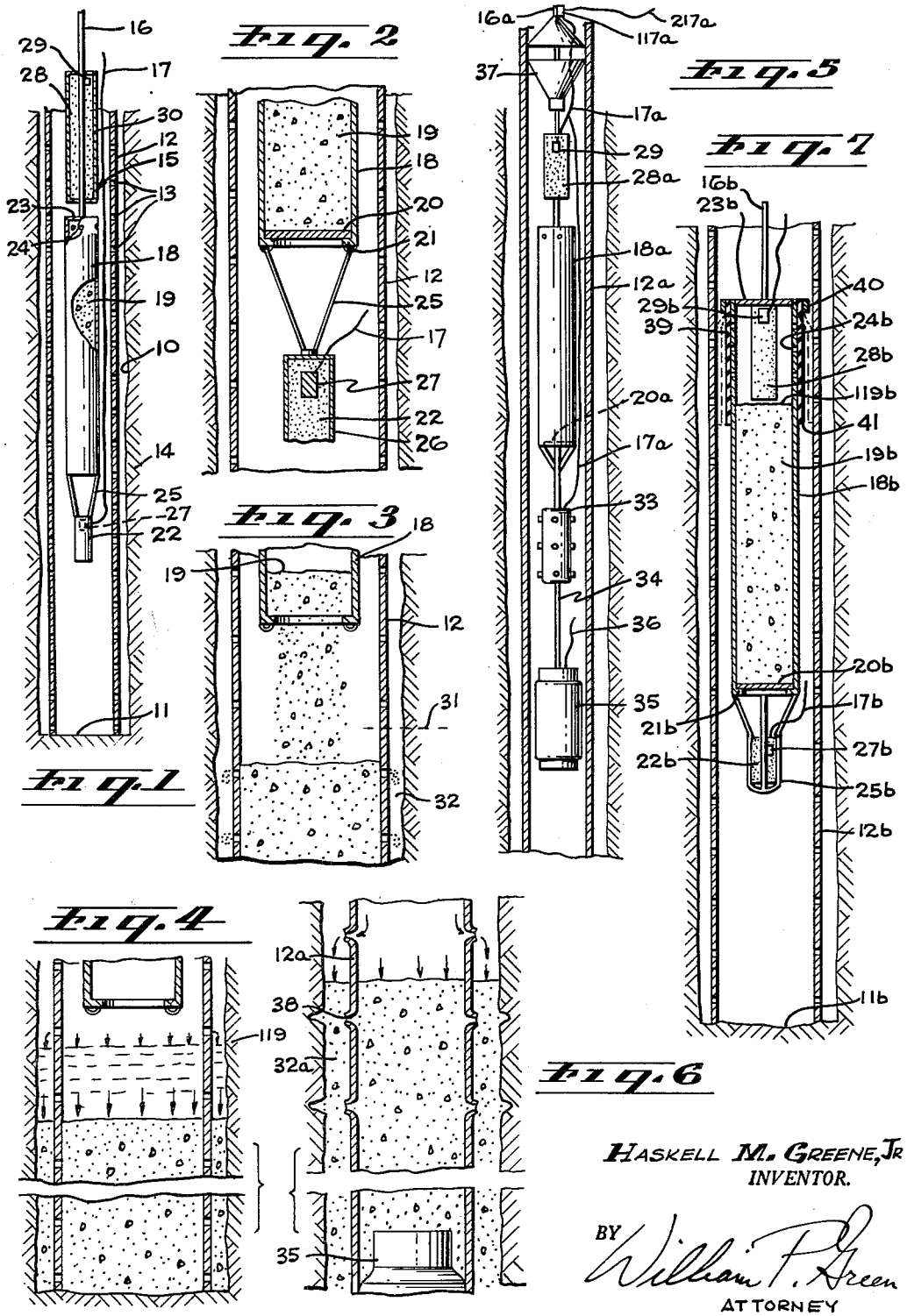
HASKELL M. GREENE, JR
INVENTOR.
BY William P. Green
ATTORNEY United States Patent Office 3,187,813
Patented June 8, 1965

3,187,813
APPARATUS FOR DEPOSITING CEMENT OR THE LIKE IN A WELL
Haskell M. Greene, Jr., 671 Galen, La Habra, Calif.
Filed Dec. 12, 1961, Ser. No. 158,693
8 Claims. (Cl. 166—55.1)

This invention relates to improved methods and apparatus for depositing a substance at a predetermined location within a well. Certain aspects of the invention are particularly applicable to the deposition and setting within a well, of a cementitious material, such as Portland cement. The invention will therefore be discussed primarily as applied to that purpose.

A major object of the invention is to provide an improved process and apparatus for locally depositing a body of cement or the like at a predetermined point within a well, squeezing the cement through perforations into the formation around the casing or liner, and then rapidly setting the cement, all with greater effectiveness than has been possible utilizing previously developed apparatus. Further contemplated is an improved method and apparatus which will attain this increased effectiveness in a considerably less expensive manner than prior arrangements.

In performing a cementing operation in accordance with the invention, I utilize a tool having a portion forming a container within which a body of the cementitious material is received, with the container being adapted to be lowered into a well to approximately the point at which the cement is to be deposited. In conjunction with this container, I employ a gas producing charge adapted to exert pressure against the cement in a manner forcing it into tight engagement with the well bore wall, and also acting to set the cement by virtue of the mentioned pressure. Desirably, the pressure of the gas producing charge is exerted against the cement through the well fluid, that is, the charge exerts pressure against the well fluid, and the latter in turn transmits that pressure to the cement.

There have in the past been proposed other cementing tools which have utilized a gas producing charge as the motive force for setting the cement within a well. A particular object of the present invention is to provide a cementing system of this general type which is capable of attaining a more effective cement setting operation with a less powerful and less expensive gas producing charge than has been required for prior similar arrangements. More specifically, the present system utilizes the gas pressure or force more efficiently, to avoid waste of any of its propellant force, and to attain a maximum effect on the cement from a charge of a predetermined capacity.

To accomplish the above discussed result, I preferably so design the tool, and so perform the method, that a major portion of the cement, and preferably all of it, is displaced from the container and into the well bore before the gas producing charge becomes effective to act against the cement, so that the force of the gases is utilized to maximum efficiency and is not wasted in displacing the cement from the container. After such pre-displacement of the cement from the container, the gas producing charge becomes effective to exert its entire force against the already freed cement, preferably by transmission of the force through the well fluid, as previously stated, so that a maximum effect can be attained in forcing the cement tightly against the well bore wall, and assuring a maximum rate of setting of the cement. As will appear, it is preferred that the cement be displaced from the container within which it is lowered into the well by gravity. In performing the method of the invention, the bottom of the container may be opened to allow the cement to fall downwardly from the container, and after the cement has had an opportunity to leave the container and seek its own level by gravity in the well, the gas producing charge is actuated to free a large quantity of gases in the well above the cement and against any well fluid that is present, and thereby produce the discussed final displacement and setting results.

The bottom of the container may be opened in any of several ways. For example, it may be opened by firing of a second gas producing charge near the bottom of the container (usually outside of and below the container), typically serving to break a frangible cement retaining disk. This second charge may also serve the function of cleaning perforations in the well liner or cleaning the pores of the earth formation, at the location to be cemented, and prior to actual contact of the cement itself with the liner or bore wall. In other situations, the device for opening the container to discharge of the cement may be a perforator, acting to form perforations in the liner or bore wall, and functioning when fired to create a shockwave capable of opening the container. Instead of these various types of apparatus for opening the container, I may employ merely a valve system, typically mechanically actuated in the manner of various known valves by raising the tool or setting it down, and acting to allow the cement to flow from the container when desired, though a valve system of this type is at present considered less desirable than the discussed gas producing charge and perforator arrangements.

Some of the advantages of the present invention, in maximizing the effectiveness with which the cement is set, result from the fact that the gases from the gas producing charge are so applied to the cement as to exert a downward force against the cement across the entire cross-section of the well, preferably even within a small clearance space at the outside of the liner or casing and between this liner or casing and the earth formation. Since the entire gas force is exerted downwardly against the cement in this manner (through well fluid if present in the well), there is no possibility as in some prior systems for a portion of the gas force to be lost in removing the cement from the container and forcing some of the cement upwardly about the liner or casing.

The above and other features and objects of the present invention will be better understood from the following detailed description of the typical embodiments illustrated in the accompanying drawing, in which:

FIG. 1 is a view representing a cementing tool constructed in accordance with the invention, as it appears when positioned within a well prior to the cementing operation;

FIG. 2 is an enlarged fragmentary representation of the lower portion of the tool of FIG. 1;

FIG. 3 is a view similar to FIG. 2, but showing the condition of the tool after the lower gas producing charge has been fired, and after most of the cement from within the tool has fallen downwardly from its container;

FIG. 4 is a view representing the manner in which the gas pressure is exerted downwardly against the entire upper surface of the cement, after the upper gas producing charge has been fired;

FIG. 5 is a view similar to FIG. 1, but showing a variational form of apparatus for performing a method embodying the invention;

FIG. 6 represents the FIG. 5 well after the cement has been freed from its container, and after firing of the upper gas producing charge; and FIG. 7 is a view representing another form of the invention.

Referring first to FIG. 1, I have represented at 10 the bore wall of a well, at a location far below the surface of the earth, and with the bottom of the well bore being represented at 11. Within the well at the production zone illustrated in FIG. 1, there is positioned the usual tubular liner or casing 12, which in the case of a liner has apertures 13 through which production fluid is to flow from formation 14 into the interior of the liner.

Within liner 12, I have shown at 15 in FIG. 1 a cementing tool constructed in accordance with the invention. This tool is suspended from the surface of the earth by an electric wire line 16, which includes or with which there is associated an electric cable or wire 17, also extending downwardly from the surface of the earth, for electrically firing the propellent charges within the tool. the tool 15 includes a cement container 18, which may take the form of a cylindrical vertically extending hollow shell of metal or the like, filled with Portland cement or other similar cementitious material 19 to be deposited in the well. The bottom of container 18 is initially closed by a frangible circular disk 20, peripherally supported on an annular inturned flange 21 formed at the bottom of container 18. Disk 20 retains the body of unset or uncured cement 19 within container 18 as the apparatus is lowered in the well, and until the disk is ruptured or broken upon operation of the tool. For this purpose, the disk may be formed of any material capable of being ruptured by a shock-wave produced by the later-to-be-discussed propellant charge 22, the material of disk 20 typically being a suitable frangible ceramic material, a thin metal disk, or a breakable plastic element. The top of container 18 may be closed by a suitable top wall 23 from which the container is suspended in the illustrated vertically extending position. For allowing the cementitious material 19 to fall by gravity from container 18, there may be provided near the upper end of the container, and typically in its side wall as shown, aperture 24 through which air or fluid may enter the top of the container as the cement falls from its bottom.

The gas producing charge 22 may be suspended from the bottom of cement container 18, as by cables or lines represented at 25 in FIGS. 1 and 2. Charge 22 may be any substance capable of emitting gases when actuated, but preferably is an ignitible propellant charge, such as gun powder, typically contained within casing 26, and adapted to be fired by a fuse 27 upon electrical energization of the fuse through line 17 leading to the surface of the earth. When fired, charge 22 produces a quantity of high temperature gases acting to flow rapidly through perforations 13 of the liner, and into the pores of the surrounding earth formation, to clean the perforations, liner, and formation, in preparation for the application of cement thereto. It is contemplated that perhaps in some instances, the gas producing charge 22 may take the form of a body of highly compressed carbon dioxide or the like, adapted to be freed from container 26 by electrical firing of the element 27. The shock-wave produced upon firing of charge 22 is sufficiently great to rupture frangible disk 20, and thereby free cement 19 to fall downwardly from container 18 and into the well.

Above container 18, the cementing tool 15 includes an upper gas producing charge 28, which may be contained within a suitable housing, and is adapted to be fired by a fuse 29 upon electrical energization thereof by line 17. The housing 30 of charge 28 may be suspended from wire line 16, which typically extends downwardly through the center of housing 30 for connection to container 18 (or container 18 may be otherwise suspended from housing 30, as by a tubular or solid rod, or the like). Line 16 and container 18 are desirably capable of withstanding without damage the forces of both propellent charges 22 and 28. Charge 28 is so designed as to produce a large quantity of high pressure gases in the well when fired by fuse 29, and for this purpose, it is preferred that the charge 28 be a combustible or explosive propellant material, such as a slow burning rocket propellant, a slow burning rifle powder, an asphalt base combustible material or the like, one typical highly effective propellent being that sold by Hercules Powder Company, Lake Junction, New Jersey, as Double Base Propellent Powder HES 5250.85. The charge 28 may also if desired by a quantity of highly compressed carbon dioxide, adapted to be heated rapidly by ignition of element 29 and thereby produce a large quantity of gases in the well.

Fuse 29 is selected to introduce a delay period into the operation of the apparatus, between the creation of the cement freeing shock-wave by lower charge 22, and the emission of the cement displacing and setting gases of upper charge 28. More particularly, the fuse 27 associated with lower charge 22 may be an instantaneous type fuse, acting to fire propellant charge 22, and cause rupture of disk 20, immediately upon electrical energization of the fuse; whereas the upper fuse 29 may be a delay type fuse, which automatically waits a predetermined interval after electrical energization and before igniting top propellant charge 28. The delay thus introduced into the firing of the upper charge, after the rupture of disk 20 and opening of container 18, should be at least about 8 seconds as a minimum, and for best results is at least about 20 seconds, with 28 seconds currently being considered the optimum delay interval. As a maximum, it is felt preferable that the delay period not be over about 5 minutes under most operating conditions.

To now discuss the manner of operation of the apparatus shown in FIGS. 1 through 4, assume that the apparatus is initially in the condition illustrated in FIG. 1, with a charge of unset or uncured Portland cement contained within housing 18, and with propellant charges of the above discussed type carried at 22 and 28, beneath and above the cement container. This assembly is lowered into the well to a point near the bottom 11 of the well, but with the lower end of container 18 spaced sufficiently above that bottom of the well to allow all of the cement 19 to ultimately fall from container 18 and be received within the well at a location beneath container 18. This spacing may be determined by merely lowering the tool until it reaches the bottom of the well, and then raising it a predetermined amount sufficient to allow for reception of all of the cement 19 beneath the lower end of the tool.

After the apparatus has been properly positioned in the well, control line 17 is energized from the surface of the earth, to electrically fire the two fuses 27 and 29. Immediately upon energization of lower fuse 27, this fuse fires propellant charge 22, to produce high temperature gases acting to clean the liner and bore wall, and also functioning to rupture disk 20 at the bottom of the cement container. Upon rupture of this disk, the cement 19, which is in fluid condition, is able to fall downwardly through the bottom opening of the container, and into the lower portion of the well. FIG. 3 illustrates the cement as it is falling downwardly into the well, and as it appears when only a small final portion of the cement still remains in the container. The cement depositing action continues by gravity until all of the cement has fallen into the well, and seeks its own level in the liner 12. It is noted particularly that the top surface of the cement, after all of the cement has fallen into the well, is located at a level beneath the lower end of container 18, say for example the level designated 31 in FIG. 3. It is assumed in FIG. 3 that the force of propellant charge 22 has been sufficiently great to disintegrate the container of the charge and the suspending line 25.

As discussed previously, the fuse 29 associated with upper propellant charge 28 is of the delay type, and does not fire upper charge 28 until after a predetermined delay period following the initial energization of line 17. After that delay period has expired, say for example a period of 28 seconds, fuse 29 ignites charge 28, which produces a very large quantity of high temperature and high pressure gases in the well above the deposited cement. The delay period is desirably sufficient to allow all of the cement to fall from container 18 before ignition of top charge 28. The gases thus produced by charge 28 act downwardly against the cement in the bottom of the well bore, and force that cement outwardly through liner perforations 13 and into the space 32 between the liner and bore wall 10. The gas force is exerted downwardly against the body of cement 19 across the entire horizontal extent of the well, including the entire cross-section of liner 12 and the cross-section of space 32 about the liner. If liquid is present in the well, as is usually the case, the gas force is transmitted downwardly to the cement through that liquid. Because the cement has already left container 18 and reached its own level in liner 12 before firing of top charge 28, the maximum effect is attained from the pressure of the high temperature gases released by charge 28. This effect is maximized by reason of the fact that the gas force is exerted downwardly against the cement across its entire upper surface, as discussed. Consequently, the placed cement is not able to move upwardly, but can only move downwardly or horizontally, and as a result an extremely effective setting action is attained, with the cement being forced tightly against the bore wall during the setting period, and with none of the pressure of the gases produced by top charge 28 being wasted as would occur if top charge 28 were fired prematurely, that is, before the cement 19 has been given sufficient time to fall downwardly by gravity from container 18 before firing of charge 28.

FIGS. 5 and 6 represent another form of the invention, which may be utilized where a cementing operation is to be performed in a well at a location spaced above the bottom of the well, and typically at a point where the casing or liner 12a of the well is unperforated or where any perforations present are plugged or inadequate. The tool assembly illustrated in FIG. 5 includes a cement container 18a which may be identical with that shown at 18 in FIG. 1, and which contains a charge of unset cement retained within the container by a frangible disk at its bottom. Also, charge 28a above container 18a may be considered to be substantially the same as charge 28 of FIG. 1, and is fired by a time delay fuse 29 energized electrically by a signal from line 17a corresponding to line 17 of FIG. 1. This line also connects with a conventional perforator 33 which is suspended from the bottom of container 18a, and is adapted to be fired instantaneously upon the application of an electrical signal to line 17. Perforator 33 may be of any known type, such as a bullet perforator or a jet perforator. At a location beneath perforator 33, there is suspended, by a line, metal tube or rod 34, a bridge plug device 35, which may be any conventional bridge plug structure capable of being expanded outwardly into engagement with casing or liner 12a, and thereby closing the casing or liner at the bridge plug location. Plug 35 is actuated in any conventional manner, as by an electric control line represented at 36.

Above charge 28a, the bore may be closed by a packer assembly 37, which may take the form of inverted resilient cups facing in opposite directions and engageable with casing 12a in a bore sealing relation. All of the units 37, 28a, 18a, 33, and 35 are suspended by a wire line 16a extending to the surface of the earth, and are connected to one another by interconnecting hollow subs, rods or wire line. The electrical energizing wires 17a and 36 may extend upwardly past cups 37 in some manner, as by extension through the center of the cups or past interruptions in their peripheries.

In using the apparatus of FIG. 5, the entire assembly is first lowered to the zone to be cemented, and bridge plug 25 is actuated to close the casing at the point at which the plug is received. Where the plug is an electrically actuated device, this result is attained by energization of line 36. If a mechanically operated bridge plug, or other type of bridge plug is employed, suitable conventional actuating means are of course provided for setting the plug in the well.

Line 17a may if desired be energized simultaneously with line 36, but preferably is energized a few seconds thereafter, say about 3 seconds afterward, with this delayed action being attained in any convenient manner, as by providing an automatic timer 117a near the upper end of the tool, which timer acts, when energized through a line 217a leading to the surface to the earth, to first energize line 36 and thereby set the bridge plug, and then after a predetermined delay to energize line 17a. As stated above, the perforator 33a may fire immediately upon energization of line 17a, with charge 28a being fired subsequently by fuse 29a after a delay period, following firing of the perforator, of a length corresponding to the delay introduced into the FIG. 1 device by fuse 29. The delay between firing of the plug and perforator is for the purpose of assuring setting of the plug before the perforator is fired and before any cement is allowed to fall onto the plug. Energization of line 17 acts to fire perforator 33, and ignite fuse 29. Firing of the perforator causes this device to form perforations 38 in casing 12a and in the bore wall opposite the perforator (see FIG. 6), so that cement may ultimately flow outwardly through these perforations. Also, the firing of the perforator sets up a shockwave of sufficient intensity to rupture the disk 20a at the bottom of container 18a, and allow the cement to fall downwardly from the container and into the casing. This cement is supported by bridge plug 35, and is predetermined in quantity as compared with the vertical spacing of container 18a and the bridge plug, so that all of the cement may flow from the container and be received above the bridge plug, with the upper surface of the cement being spaced beneath the bottom edge of the container 18a. It is assumed in the drawings that the perforator 33 is of a self-destroying type, and this perforator has therefore not been shown in FIG. 6. However, a nondestructable type of perforator may be employed, if desired, and may be withdrawn from the well with container 18a and the other apparatus above the container, after completion of the cementing operation. In this case, the line 34 which suspends plug 35 should be weak enough to be destroyed by firing of the perforator, to allow the plug to be left in the well.

Fuse 29a introduces a delay into the firing of charge 28a, which delay is desirably sufficient to allow all of the cement to fall from container 18a, and seek its own level in the well, before charge 28a is fired. When charge 28a is ultimately fired, it produces a large quantity of high temperature gases, as discussed in connection with charge 28 of FIG. 1, acting to exert force downwardly against the upper surface of the cement across the entire horizontal section of the casing and outer space 32a (through liquid if any is present in the well). In this way, a very effective cement setting action is attained, with the cement being forced tightly against the well bore wall, and into the perforation in both the casing and earth formation. Some of the cement may tend to fall downwardly through space 32a at a point laterally opposite bridge plug 35, to therefore bypass the bridge plug; but the viscosity of the cement is great enough that no substantial portion of the cement can actually pass downwardly at this point.

FIG. 7 represents another form of the invention, in which the cement container 18b is so formed as to itself receive and contain the upper propellant charge 28b within the container at a level above the top surface 119b of cement 19b. The top of container 18b may be closed by a top wall 23b which is connected to the suspending cable 16b. At a location beneath this top wall, the cylindrical side wall of container 18b may have apertures 24b through which some of the gases produced by charge 28b are able to escape laterally from the container.

These laterally escaping gases act to expand a packer sleeve 39 radially outwardly against the casing or liner 12b, into annular engagement therewith, to form a seal preventing the escape of gases upwardly past packer 39. The packer sleeve 39 may be formed of rubber or other resiliently expansible material, and may be clamped annularly to the side wall of container 18b, at the upper end of packer sleeve 39, by a clamping ring represented at 40. Beneath this point 40, the packer sleeve may be free for expansion radially outwardly, even at the lower edge 41 of the packer. Thus the gases from charge 28b expand the packer outwardly into sealing engagement with casing or liner 12b, and then are free to escape downwardly past the lower edge 41 of the packer and about container 18b.

The cement 19b is held within container 18b by a frangible disk 20b, supported on a flange 21b at the bottom of the container, which disk is adapted to be ruptured by firing of a bottom propellant charge 22b, which is ignited by line 17b. In FIG. 7, the lower charge 22b is typically illustrated as being supported by and within a bottom cage or web structure 25b attached to the lower end of container 18b. The mentioned line 17b, in addition to firing the lower charge, also ignites top charge 28b through a time delay fuse 29b having the same delaying characteristics discussed in connected with fuse 29 of FIG. 1.

In utilizing the tool of FIG. 7, the first step is of course to lower the tool to a desired cementing location, typically spaced a short distance above the level of the bottom 11b of the well. When thus positioned, the tool is fired by energization of electric line 17b, which first fires propellant charge 22b to open the perforations of liner 12b, and simultaneously rupture disk 20b. The cement then falls down by gravity into the lower portion of the well, with the upper surface of the cement in its final position being received beneath the lower end of container 18b. Charge 28b at the top of the device is desirably fired by delay fuse 29b after the cement has all left container 18b by gravity. The high temperature and high pressure gases produced by upper propellant charge 28b then act downwardly against the cement, across its entire upper surface, to effectively force the cement into tight engagement with the bore wall, and properly set or cure the cement within the well. Also, the gases escaping laterally from charge 28b through apertures 24b in the side wall of container 18b act to expand the packer at 39 in the previously discussed manner against liner or casing 12b, to prevent upward escape of any of the gases from the well. These gases which expand the packer flow downwardly from the lower end of the packer and are thereby able to add their downward force to that of the other gases, in assuring proper setting of the cement, and preventing any of the cement from moving upwardly. The cylindrical side wall and imperforate top wall 23b of container 18b are of course rigid and strong enough to withstand without damage or deformation the forces of the propellant charges.

It is contemplated that the propellant charge 22 of FIG. 2 and the corresponding charge 22b of FIG. 7 may take any of numerous different forms. As one variation, it is specifically noted that these charges may take the form of long vertical strings of fuse-like explosive material, such as the material referred to conventionally as "cordite," hanging from the cement container and adapted to produce an explosive force along a very extended vertical distance, and to clean the liner apertures through that entire distance by the action resulting from the explosion.

I claim:

1. A tool assembly to be lowered into a well on a flexible line, comprising a container having a mass of cementitious material therein, means for opening a lower portion of said container while in the well and thereby allowing said cementitious material to flow downwardly from the container and into the well by gravity, said assembly being constructed to essentially avoid the application to the cementitious material of additional displacing forces other than gravity during said downward flow so that the cementitious material after leaving the container may seek its own level in the well by gravity, a gas producing charge connected to said container to be lowered therewith into the well on the same run as said container and the cementitious material, and means for actuating said gas producing charge while in the well with said container at a location to produce a large quantity of gases in the well above said gravity deposited cementitious material after a predetermined delay period of at least about 8 seconds following the opening of said container and after a large portion of said cementitious material has fallen by gravity out of said container, said charge being positioned to apply the force of said gases downwardly against the upper surface of said gravity deposited cementitious material to force the latter tightly against the well bore wall and initiate setting of said material.

2. A tool assembly to be lowered into a well on a flexible line comprising a container having a mass of cementitious material therein, means for opening a lower portion of said container while in the well and thereby allowing said cementitious material to flow downwardly from the container and into the well by gravity, said assembly being constructed to essentially avoid the application to the cementitious material of additional displacing forces other than gravity during said downward flow so that the cementitious material after leaving the container may seek its own level in the well by gravity, a gas producing charge connected to said container to be lowered therewith into the well on the same run as said container and the cementitious material, and automatic timed control means operable in predetermined timed relation to said container opening means to automatically actuate said gas producing charge while in the well with said container at a location to produce a large quantity of gases in the well above said gravity deposited cementitious material after a predetermined delay period of at least about 8 seconds following the opening of said container and after a large portion of said cementitious material has fallen by gravity out of said container, said charge being positioned to apply the force of said gases downwardly against the upper surface of said gravity deposited cementitious material to force the latter tightly against the well bore wall and initiate setting of said material.

3. A tool assembly to be lowered into a well on a flexible line comprising a container having a mass of cementitious material therein, a first gas producing charge connected to the container to be lowered into the well therewith and operable when actuated to open a lower portion of said container while in the well and thereby allow said cementitious material to flow downwardly from the container and into the well by gravity, said assembly being constructed to essentially avoid the application to the cementitious material of additional displacing forces other than gravity during said downward flow so that the cementitious materal after leaving the container may seek its own level in the well by gravity, a second gas producing charge connected to said container to be lowered therewith into the well on the same run as said container and the cementitious material and first charge, and means for actuating said second gas producing charge while in the well with said container at a location to produce a large quantity of gases in the well above said gravity deposited cementitious material after a predetermined delay period of at least about 8 seconds following the opening of said container by said first charge and after a large portion of said cementitious material has fallen by gravity out of said container, said second charge being positioned to apply the force of said gases downwardly against the upper surface of said gravity deposited cementitious material to force the latter tightly against the well bore and initiate setting of said material.

4. A tool assembly to be lowered into a well on a flexible line comprising a container having a mass of cementitious material therein, a first gas producing charge connected to the container to be lowered into the well therewith and operable when actuated to open a lower portion of said container while in the well and thereby allow said cementitious material to flow downwardly from the container and into the well by gravity, said assembly being constructed to essentially avoid the application to the cementitious material of additional displacing forces other than gravity during said downward flow so that the cementitious material after leaving the container may seek its own level in the well by gravity, a second gas producing charge connected to said container to be lowered therewith into the well on the same run as said container and the cementitious material and first charge, and automatic timed control means operable in predetermined timed relation to said container opening means to automatically actuate said second gas producing charge while in the well with said container at a location to produce a large quantity of gases in the well above said gravity deposited cementitious material after a predetermined delay period of at least about 8 seconds following the opening of said container by said first charge and after a large portion of said cementitious material has fallen by gravity out of said container, said second charge being positioned to apply the force of said gases downwardly against the upper surface of said gravity deposited cementitious material to force the latter tightly against the well bore and initiate setting of said material.

5. A tool assembly to be lowered into a well on a flexible line comprising a container having a mass of cementitious material therein, means for opening a lower portion of said container while in the well and thereby allowing said cementitious material to flow downwardly from the container and into the well by gravity, said assembly being constructed to essentially avoid the application to the cementitious material of additional displacing forces other than gravity during said downward flow so that the cementitious material after leaving the container may seek its own level in the well by gravity, a gas producing charge connected to said container to be lowered therewith into the well on the same run as said container and the cementitious material, and means for actuating said gas producing charge while in the well with said container at a location to produce a large quantity of gases in the well above said gravity deposited cementitious material after a predetermined delay period of at least about 8 seconds following the opening of said container and after a large portion of said cementitious material has fallen by gravity out of said container, said charge being positioned to apply the force of said gases downwardly against upper surface of said gravity deposited cementitious material to force the latter tightly against the well bore wall and initiate setting of said material, and a packer connected to said container to be lowered therewith and actuable by the force of said gases against the well bore wall in a relation forming a seal against upward escape of said gases.

6. A tool assembly to be lowered into a well on a flexible line comprising a container having a mass of cementitious material therein, a frangible closure near the bottom of said cementitious material and retaining said material in the container, a first gas producing propellant charge carried by the container near said closure to be lowered into the well therewith and operable when actuated to create a shock wave in the well and also break said closure and thereby allow said cementitious material to flow downwardly from the container and in to the well by gravity, said assembly being constructed to essentially avoid the application to the cementitious material of additional displacing forces other than gravity during said downward flow so that the cementitious material after leaving the container may seek its own level in the well by gravity, a second gas producing propellant charge connected to said container above said cementitious material to be lowered therewith into the well on the same run as said container and the cementitious material and first charge, and automatic timed control means operable in predetermined time relation to said container opening means to automatically actuate said second gas producing propellant charge while in the well with said container at a location to produce a large quantity of gases in the well above said gravity deposited cementitious material after a predetermined delay period of at least about 8 seconds following the opening of said container by said first charge and after a large portion of said cementitious material has fallen by gravity out of said container, said charge being positioned to apply the force of said gases downwardly against the upper surface of said gravity deposited cementitious material to force the latter tightly against the well bore wall and initiate setting of said material, and a packer connected to said container to be lowered therewith and actuable by the force of said gases against the well bore wall in a relation forming a seal against upward escape of said gases.

7. A tool assembly to be lowered into a well on a flexible line comprising a container having a mass of cementitious material therein, means for opening a lower portion of said container while in the well and thereby allowing said cementitious material to flow downwardly from the container and into the well by gravity, said assembly being constructed to essentially avoid the application to the cementitious material of additional displacing forces other than gravity during said downward flow so that the cementitious material after leaving the container may seek its own level in the well by gravity, a gas producing charge connected to said container to be lowered therewith into the well on the same run as said container and the cementitious material, means for actuating said gas producing charge while in the well with said container at a location to produce a large quantity of gases in the well above said gravity deposited cementitious material after a predetermined delay period of at least about 8 seconds following the opening of said container and after a large portion of said cementitious material has fallen by gravity out of said container, said charge being positioned to apply the force of said gases downwardly against the upper surface of said gravity deposited cementitious material to force the latter tightly against the well bore wall and initiate setting of said material, and a bridge plug carried at a location beneath said container and lowerable into the well therewith and operable to close the well at that location and support said cementitious material.

8. A tool assembly to be lowered into a well on a flexible line comprising a container having a mass of cementitious material therein, a perforator connected to the container to be lowered into the well therewith, a closure retaining said material in said container and constructed and positioned to be opened by firing of said perforator and allow said cementitious material to flow downwardly from the container and into the well by gravity, said assembly being constructed to essentially avoid the application to the cementitious material of additional displacing forces other than gravity during said downward flow so that the cementitious material after leaving the container may seek its own level in the well by gravity, a gas producing charge connected to said container to be lowered therewith into the well on the same run as said container and the cementitious material and perforator, and means for actuating said gas producing charge while in the well with said container at a location to produce a large quantity of gases in the well above said gravity deposited cementitious material after a predetermined delay period of at least about 8 seconds following the opening of said container and after a large portion of said cementitious material has fallen by gravity out of said container, said charge being positioned to apply the force of said gases downwardly against the upper surface of said gravity deposited cementitious material to force the latter tightly against the well bore wall and initiate setting of said material.

References Cited by the Examiner

UNITED STATES PATENTS

| | | | |
|---|---|---|---|
| 2,591,807 | 4/52 | Green | 166—23 |
| 2,689,008 | 9/54 | Allen et al. | 166—23 |
| 2,696,259 | 12/54 | Green | 166—63 |
| 2,956,625 | 10/60 | Toelke | 166—63 |
| 2,978,029 | 4/61 | O'Reilly | 166—63 |
| 3,052,297 | 9/62 | Blydorp | 166—63 X |

CHARLES E. O'CONNELL, *Primary Examiner.*